(12) United States Patent
Schrader

(10) Patent No.: US 6,308,383 B1
(45) Date of Patent: Oct. 30, 2001

(54) APPARATUS AND SYSTEM FOR SECURING CARGO

(75) Inventor: Darren E. Schrader, Portland, OR (US)

(73) Assignee: Schrader-Dane Corporation, Portland, OR (US)

( * ) Notice: Subject to any disclaimer, the term of this patent is extended or adjusted under 35 U.S.C. 154(b) by 0 days.

(21) Appl. No.: 09/596,019

(22) Filed: Jun. 14, 2000

Related U.S. Application Data

(63) Continuation-in-part of application No. 09/197,241, filed on Nov. 20, 1998, now Pat. No. 6,094,784.

(51) Int. Cl.⁷ .............................. A44B 21/00; F16B 45/00
(52) U.S. Cl. ............... 24/265 H; 24/136 R; 24/265 CD; 24/598.5
(58) Field of Search .......................... 24/265 CD, 265 H, 24/265 EE, 68 CD, 573.3, 573.5, 598.5, 136 R

(56) References Cited

U.S. PATENT DOCUMENTS

| | | |
|---|---|---|
| 107,859 | 10/1870 | Blasir . |
| D. 273,273 | 4/1984 | Faidide . |
| D. 307,705 | 5/1990 | Mair . |
| D. 329,371 | 9/1992 | Jou . |
| D. 330,669 | 11/1992 | Hui-Chuan . |
| D. 358,114 | 5/1995 | Botsford . |
| D. 381,893 | 8/1997 | Klamm . |
| 658,124 | 9/1900 | Semple . |
| 2,629,155 | 2/1953 | Belpedio . |
| 2,743,684 * | 5/1956 | Elsner ............................. 24/265 CD |
| 3,751,772 | 8/1973 | Grandjanny . |
| 4,340,998 | 7/1982 | Liberge . |
| 4,368,999 | 1/1983 | Morel . |
| 4,432,121 | 2/1984 | Dupre . |
| 4,577,374 | 3/1986 | Lii . |
| 4,622,724 | 11/1986 | Dupre . |
| 4,831,692 | 5/1989 | Chuan . |
| 4,993,123 | 2/1991 | Siwek . |
| 5,003,672 | 4/1991 | Randall . |
| 5,035,558 | 7/1991 | Prosen . |
| 5,136,756 | 8/1992 | Krauss . |
| 5,230,295 | 7/1993 | Shell . |
| 5,317,788 | 6/1994 | Esposito et al. . |
| 5,383,259 | 1/1995 | McIntire . |
| 5,546,639 | 8/1996 | Lacore et al. . |
| 5,669,119 * | 9/1997 | Seron ................................. 24/265 H |

FOREIGN PATENT DOCUMENTS 0008994 of 1909 (GB) .

* cited by examiner

*Primary Examiner*—Victor N. Sakran
(74) *Attorney, Agent, or Firm*—Ipsolon llp

(57) ABSTRACT

A securement system includes a hook having a retaining clip, and an end cap that attaches to an end of a tubular structural member. The hook has a base with at least one channel having a lateral opening thereto. The clip is assembled with the hook such that the clip closes the lateral opening into the channel to define a longitudinal passageway through the hook. An elastic cord extends through the structural member, through the end cap and through the longitudinal passageway through the hook. A knot or some other stop is placed on the cord to prevent the end of the cord from moving through the passageway. The end cap includes V-shaped notches that receive and anchor the cord at desired positions to facilitate securement of cargo to the structural member.

13 Claims, 11 Drawing Sheets

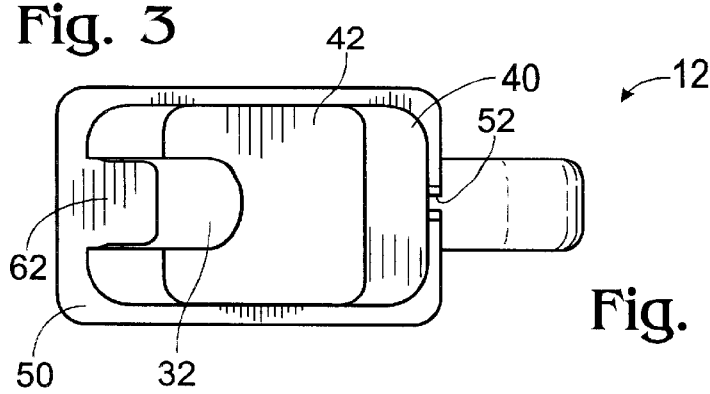
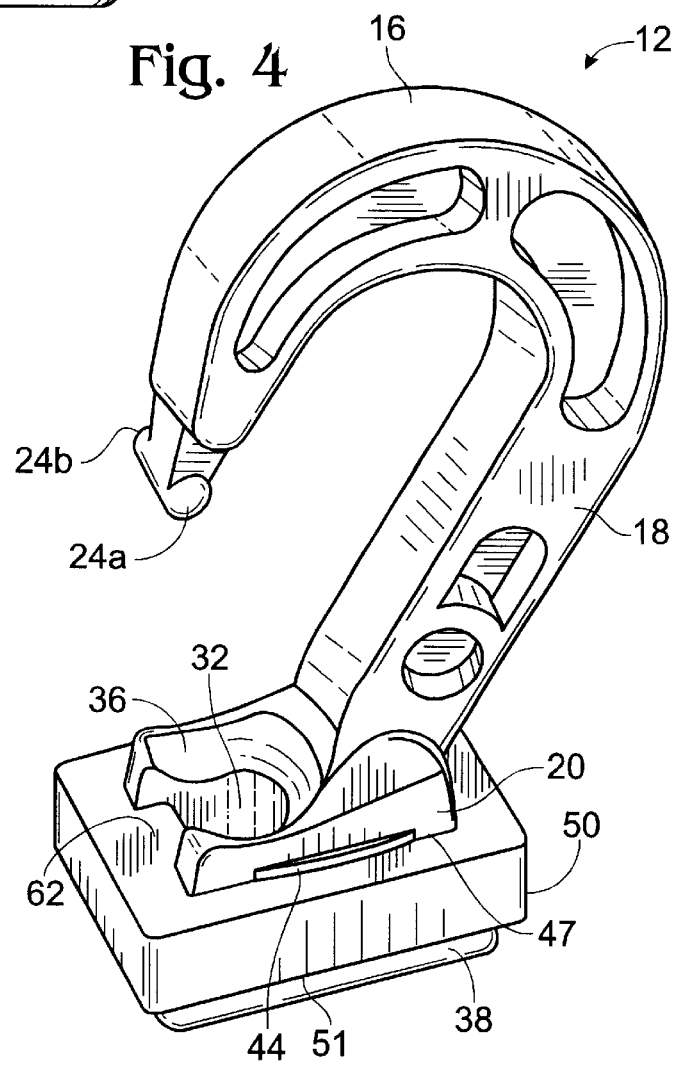
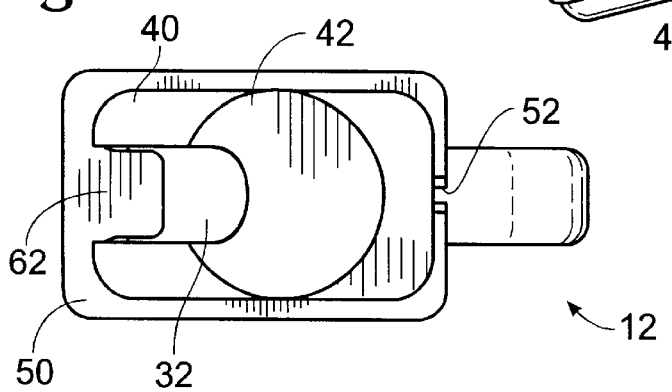

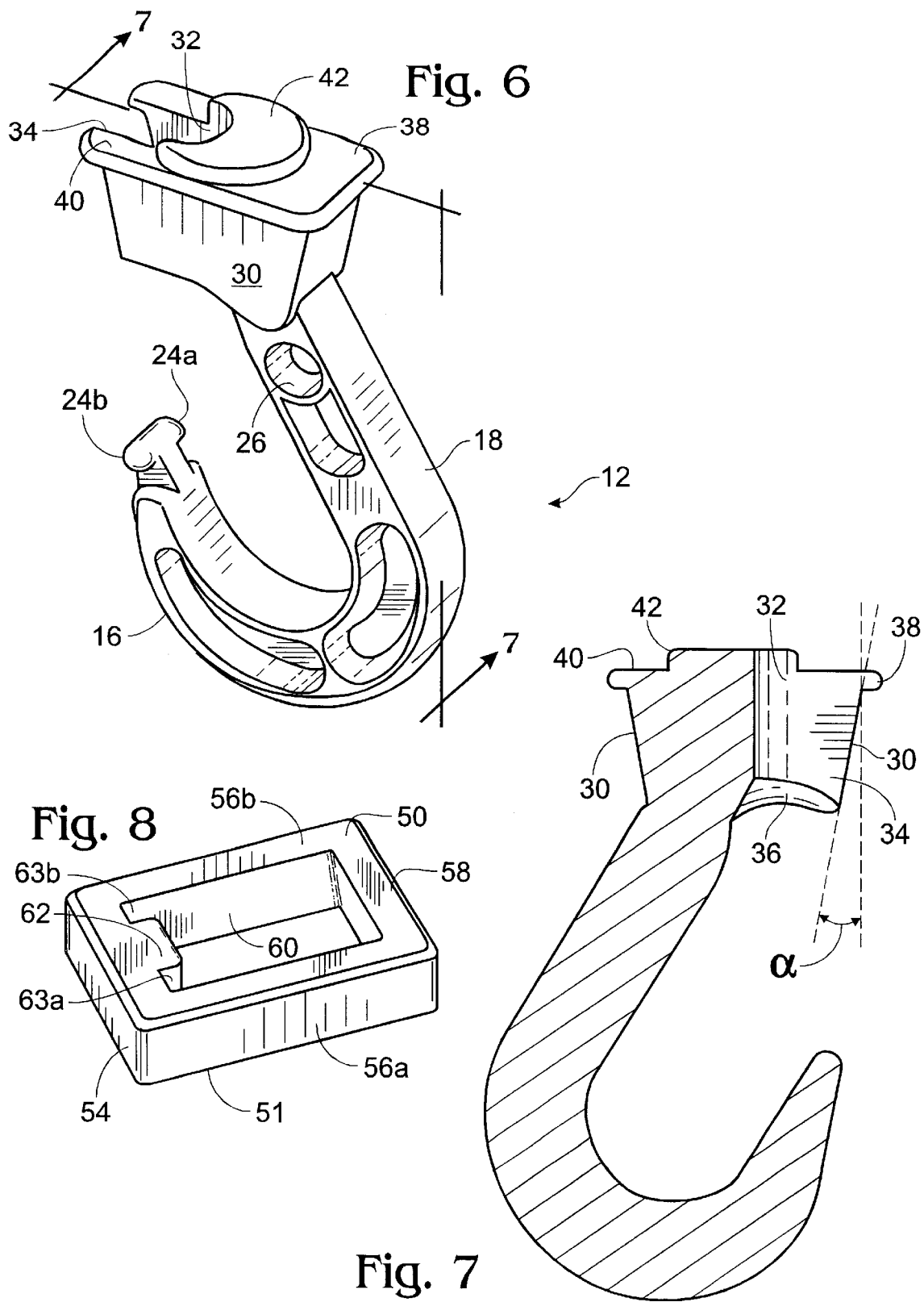

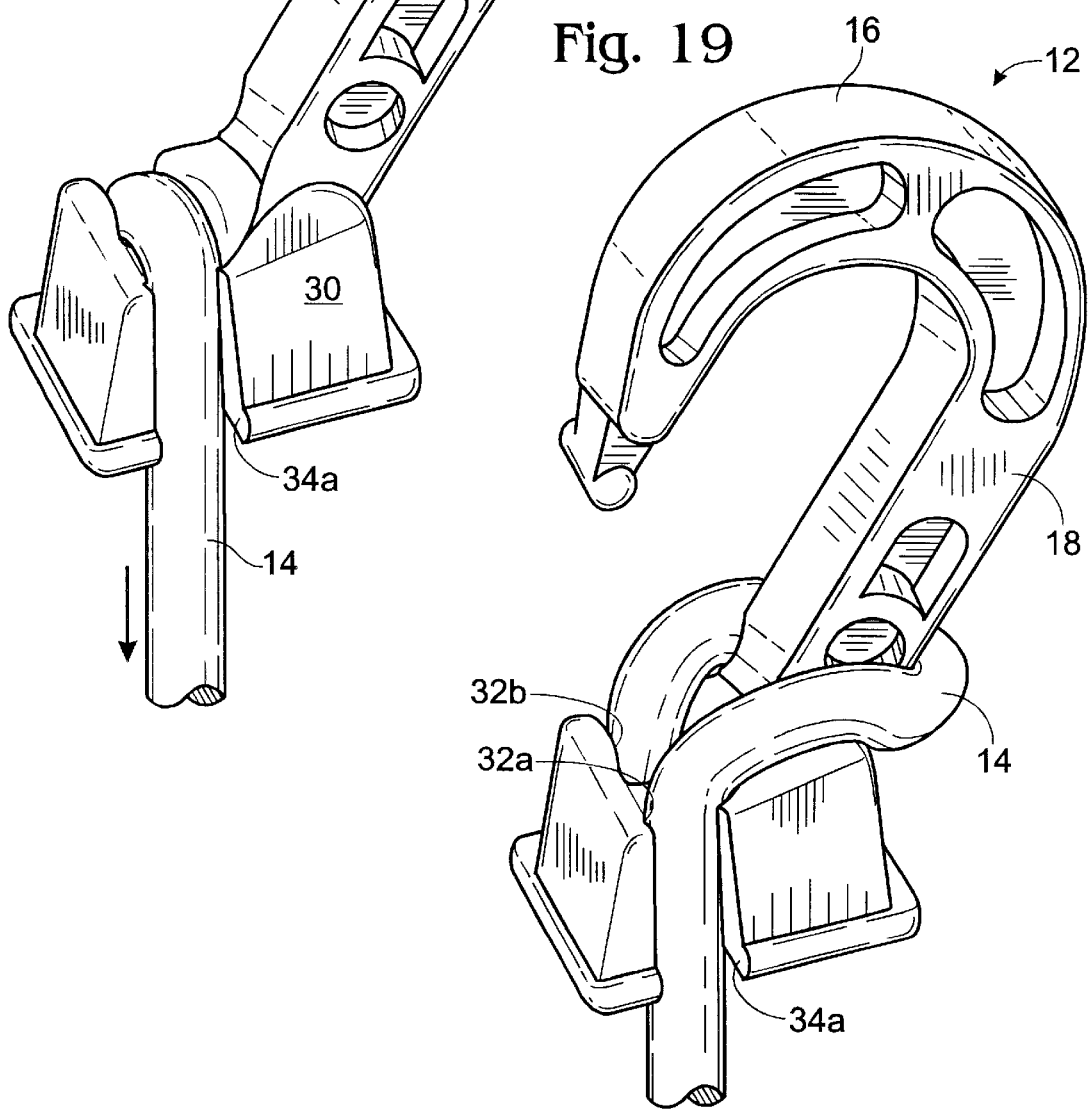

US 6,308,383 B1

APPARATUS AND SYSTEM FOR SECURING CARGO

RELATED U.S. APPLICATION DATA

Continuation-in-part of Ser. No. 09/197,241, Nov. 20, 1998 now U.S. Pat. No. 6,094,784.

FIELD OF THE INVENTION

This invention relates to an apparatus and system for securely attaching cargo and the like to a support structure to prevent unwanted movement of the cargo relative to the support, for example during transport. More particularly, this invention relates to an apparatus and system for securing cargo such as bicycles, luggage, ladders, hand trucks and the like to support structures such as racks on motor vehicles, thereby preventing undesired movement of the cargo while the motor vehicle is moving.

The invention also relates to various components of the securement system that may be used in other applications. For example, the securement system of the invention utilizes hooks that are capable of being positioned at an intermediate position along a cord having two fixed ends, thereby being useful for securing a variety of devices.

BACKGROUND OF THE INVENTION

Whenever cargo is transported on a moving vehicle it is essential that the cargo be securely attached to the vehicle. Without secure attachment between the cargo and the vehicle, shifting or other movement of the cargo may occur as the vehicle moves, leading to damage to the cargo or even to accidents in which not only may the cargo be damaged, but people may be injured.

There are many methods for attaching cargo to vehicles, most of the methods depending upon the nature of the cargo and the kind of vehicle transporting the cargo. One of the most common methods of securing cargo, and one that is both useful and effective, is to strap the cargo to the vehicle, or to a rack on the vehicle, with one or more cargo straps. For instance, cargo may be supported on a vehicle rack and one or more straps are connected between the cargo and the rack to provide a secure attachment and to prevent undesired movement of the cargo during transport.

The strap method is used with many kinds of cargoes and vehicles, from logs carried on logging trucks to relatively smaller cargo items such as boxes carried in the bed of a standard pick up truck. The use of straps to tie cargo to a supporting structure is particularly useful with relatively lighter cargoes such as bicycles, ladders, hand trucks, wheelbarrows and other light industrial tools that are attached to racks for pick up trucks or car-top racks for automobiles.

However, a common problem encountered with using straps to secure cargo to a vehicle is that the straps are often misplaced or lost, or are not readily available when the time comes for strapping the cargo to the rack. As anyone who has experienced a lost cargo strap knows, a lost strap can be a significant inconvenience, as an inordinate amount of time can be spent hunting for the lost strap. In addition, when securing cargo to a rack it is often necessary to have the strap immediately available at the time the cargo is loaded onto the rack, for instance when the strap itself provides part of the support system for the cargo.

In addition to the problems associated with lost or misplaced straps, another common problem is not having enough straps on hand to adequately secure the load to the vehicle. This problem is often a result of the problem just described-lost or misplaced straps. That is, since straps are often lost, there may not be enough of them available when the time comes for them to be used. Regardless of the source of the problem, it is inconvenient to have too few straps available, and may lead to a load being inadequately secured on a vehicle.

There is a need therefore for improved apparatus for securing cargo to supports, and particularly apparatus that eliminates the problems associated with lost securing straps and not having enough straps to secure the cargo.

Many cargo securement systems utilize a combination of safety hooks of various shapes combined with elastic cords commonly known as bungee cords. For example, U.S. Pat. No. 4,432,121 describes a safety hook having a guiding tunnel and an anchoring beak for securing the cord in a fixed position on the hook. The beak forms an offset cavity with a facing wall of the base portion of the hook, and the beak is used to grip the cord when it is looped through the guiding tunnel and is crimped within the beak. This system allows the position of the hook to be adjusted along the length of the cord.

As another example of such a combination hook with bungee cord is described in U.S. Pat. No. 5,317,788. That patent describes a hook that is attached to the terminal end of a bungee cord and which has finger holes molded into the body of the hook.

One further example of a hook and bungee device is shown in U.S. Pat. No. Des. 307,705. That patent illustrates a hook having a gated hook end and a base having one transversely open channel and one closed channel. The body of the hook includes a V-shaped opening for crimping the bungee. In use, a bungee is threaded through a channel in the base, through the V-shaped opening, and through the other channel. The hook is secured in place along the length of the cord by the crimping action of the V-shaped opening.

However, a problem commonly encountered with present securement systems such as those described in U.S. Pat. Nos. Des. 307,705 and 5,317,788 is that it is impossible to position the hook in an intermediate position along the length of the bungee cord when the two ends of the cord are fixed. For example, an end of the cord used with the hook shown in U.S. Pat. No. Des. 307,705 must be threaded through multiple openings, which of course requires a free terminal end. With U.S. Pat. No. 5,317,788 the hook is fixed to a terminal end of the cord. And while it is possible with the hook shown in U.S. Pat No. 4,432,121 to position the hook on a cord between the two ends, it may be difficult to position the hook at an intermediate location when the cord is under any significant amount of tension. Many tarpaulins such as those used for camping have bungee cord threaded through a series of grommets spaced around the periphery of the tarpaulin. To fix the tarpaulin in a useful configuration, such as a lean-to, it is necessary to attach the tarpaulin to fixed objects at selected positions around the periphery by connecting the cord to the fixed object. It would be advantageous to be able to selectively position a removable hook at any position around the tarpaulin. Positioning the hook of U.S. Pat No. 4,432,121 at such an intermediate position requires that a loop be formed in the cord and that the loop be fed through the laterally closed channel through the base of the hook. This may be difficult if the cord is under significant tension.

SUMMARY OF THE INVENTION

This invention relates to a cargo-securement apparatus and system for securing cargo of various kinds to support structures such as motor vehicle racks. The apparatus comprises component parts that may be used with standard car top racks to provide a securement system that may be used to attach cargo to the racks. Elastic cord that is used to secure the cargo is carried in an elongate tubular member that is a component part of the rack. The cord extends through a passageway in an end piece attached to an end of the tubular member. The end piece includes one or more V-shaped notches that function as a pinch or crimping point for binding the cord when it is extended to a desired length. A removable hook is attached to the cord outwardly of the end piece. When the securement system is not in use it is retracted such that the hook rests against an outer end of the tubular member.

When there is a need to secure the cargo to the rack, the adjustable cord is extended out of the tubular member to a selected length, crimped in a selected V-shaped notch in the end piece to anchor the cord relative to the end piece, and the hook is attached either directly or indirectly to the cargo to securely attach the cargo to the rack.

In another preferred embodiment of the present invention, the hooks that are used in the securement system are capable of being attached to a bungee cord at any position between the two ends of the cord. The hooks include a body having a base portion with one or more channels, each of which has a lateral opening thereto. With the cord inserted into the channel a removable clip is positioned around the base of the hook to close the lateral opening into the channel or channels, and to thereby lock the cord within the channels.

BRIEF DESCRIPTIONS OF THE DRAWINGS

FIG. 3 is a bottom plan view of a first embodiment of the hook of the present invention with the clip in place on the hook.

FIG. 4 is a top perspective view of the hook of the present invention with the clip in place on the hook.

FIG. 5 is a bottom plan view of a second embodiment of the hook of the present invention with the clip in place on the hook.

FIG. 6 is a bottom perspective view of the hook shown in FIG. 5.

FIG. 7 is a cross sectional elevational view taken along the line 7—7 of FIG. 6.

FIG. 8 is a top perspective view of a second embodiment of a clip according to the present invention.

FIG. 18 is a top perspective view of the hook embodiment shown in FIG. 16 shown with the cord.

FIG. 19 is a top perspective view of the hook embodiment shown in FIG. 16 shown with the cord in an alternate orientation.

DETAILED DESCRIPTION OF PREFERRED EMBODIMENTS

Securement System Overview

Figure 1:
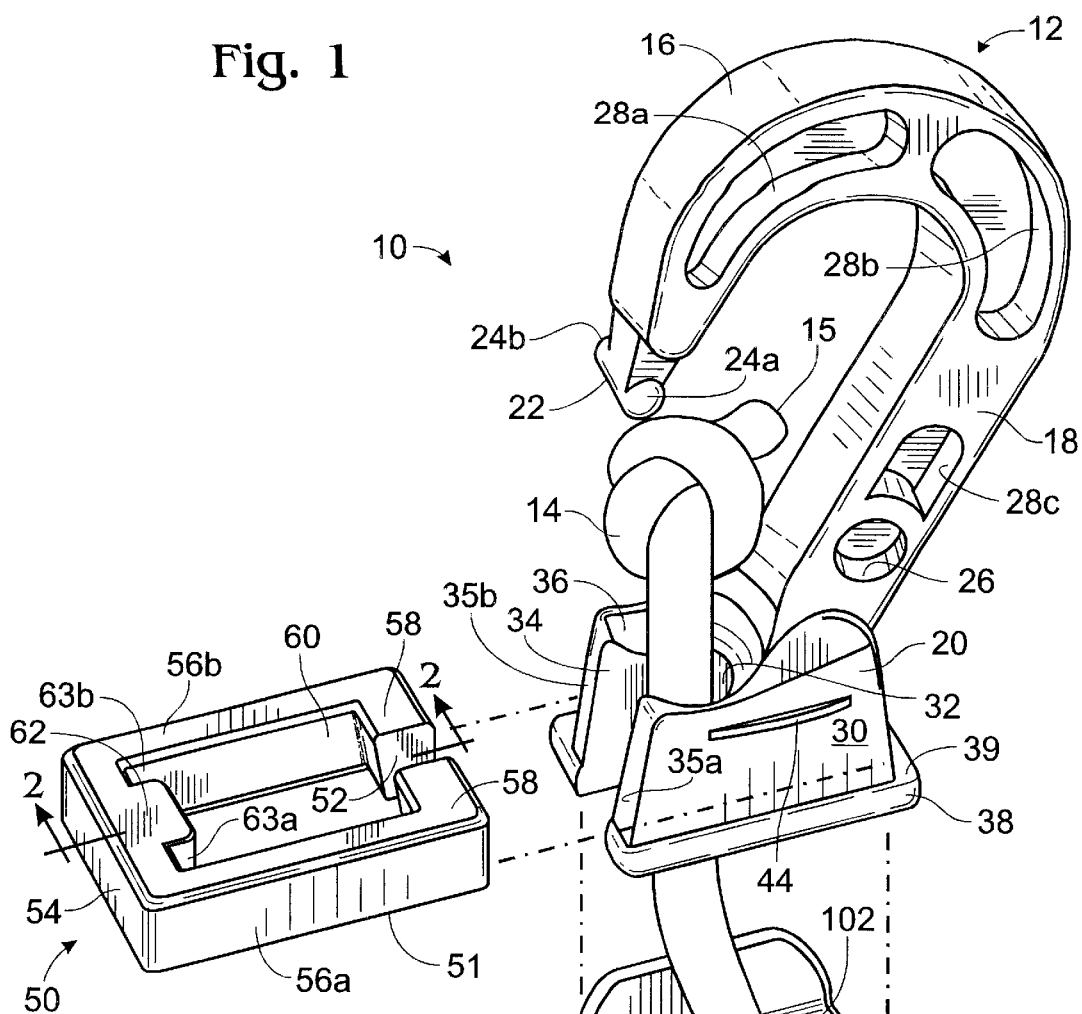
FIG. 1 is a top perspective, exploded view of the securement system of the present invention showing the components of the system.

A preferred embodiment of the securement system 10 of the present invention is shown in FIG. 1 in an exploded view with the components separated. The securement system includes a hook 12, a retaining clip 50, and an end cap 100 that attaches to an end of a tubular structural member 150 that is a component of a vehicle rack or some other structural member. For example, member 150 is typically a cross bar on a car top rack or a structural component of, for instance, a rack for a pickup truck. However, the structural member could be virtually any tubular member that is a part of a rack system of even a component of a piece of cargo, so the securement system of the present invention is not limited to use with vehicle racks. For instance, the structural member could be a component of a device such as a hand truck or a wheelbarrow.

A cord 14 (typically though not necessarily an elastic bungee-type cord-the cord need not be elastic) extends through a channel in hook 12, through end cap 100, and through the hollow interior of member 150. As described below, the one terminal end 15 of the cord shown in FIG. 1 is knotted or otherwise enlarged—for instance with a folded over section that has been crimped—to prevent the cord end from passing through the channel in the hook. The opposite terminal end of cord 14, which is not shown in FIG. 1, is fixed either within the tubular member or extends through a like securement system at the opposite end of member 150. Although in most instances cord 14 will be of the bungee-type, cords formed of other material may also be adapted for use with the present invention.

The components of the securement system are preferably manufactured of a strong, lightweight plastic material that may be molded into the desired shapes. However, the components may be manufactured of other materials such as nylon or metal, or combinations of these materials. The selection of the particular materials used to fabricate the components of the system depends upon the particular use for which the system is being manufactured, as will be appreciated by those skilled in the art. For instance, if the components are to be manufactured from a plastic material, the specific type of plastic will depend upon factors such as strength requirements, desired resistance to chemicals, environmental considerations including the type and range of temperatures in which the components will be used, and other factors specific to a particular application.

System Components

Hook 12

A first embodiment of hook 12 is illustrated in FIGS. 1, 3 through 7, and 11. In FIGS. 3 through 5 and 1 the retaining clip 50 is shown positioned around the base of the hook.

Referring to FIG. 1, hook 12 includes a curved hook section designated with reference number 16 and defining an opening into the hook. Hook 12 further includes a shank section designated with reference number 18, and a base section designated with reference number 20. Hook end 22 of hook 12 includes a pair of transverse outwardly projecting knobs 24a, 24b. Although not shown in the figures, a gate similar to a well-known carabiner gate may be included with the hook 12 for closing the opening into the curved section of the hook to thereby secure the hook to another object, or to confine an object such as a cord in the hook and prevent the confined object from escaping out of the hook. If such a gate is provided, the gate is pivotally mounted in paired recesses 26 on shank 18 (only one of which is shown in FIG. 1) and projects toward hook end 22. The gate includes recessed portions on the outer end that are configured and positioned to engage the outwardly projecting knobs 24a and 24b when the gate is moved into a position where it closes the opening into the hook.

Hook 12 is shown including plural recesses 28a, 28b and 28c along the curved and shank sections of the hook body. These recesses are for structural purposes only and may be omitted or the position and number of the recesses may be varied.

In the preferred embodiment the base section 20 of hook 12 is generally rectangular, although the general shape of the base may be varied. The outwardly facing side walls 30 of base 20 slope outwardly and downwardly from the upper portion of the base section where the shank section 18 of the hook meets the base section and terminate at an outwardly projecting lip 38 extending around the lowermost portion of the base. The outwardly projecting lip 38,defines a peripheral shoulder area 39 extending around a major portion of the base.

A channel 32 formed through base 18 on the hook end 22 side of hook 12 has an opening along its entire length defining a lateral opening 34 into the channel 32. As shown in FIG. 1 and as described in more detail below, the lateral opening 34 into channel 32 allows cord 14 to be inserted laterally into channel 32. The uppermost end of channel 32 (i.e., the end of channel 32 nearest the point where base 20 meets shank 18) is formed into a smooth concave shoulder 36, the function of which is to receive and seat the knotted, crimped or pre-crimped cord when the cord extends through channel 32 and tension is applied to the cord. Channel 32 further defines two legs 35a and 35b in base section 20, one on either side of the lateral opening 34 into channel 32.

An outwardly projecting flange 44 is formed on side wall 30 of base 20. A similar flange may be formed on any one or more of the side walls, and the flange itself may extend partially across the side wall, as shown in FIG. 1, or alternately may extend completely around the base. The purpose of flange 44 is detailed below.

As best illustrated in FIG. 7, which is a cross sectional view through hook 12, concave shoulder 36 extends completely around the uppermost end of the channel 32.

Again referring to FIG. 7, it may be seen that the side walls 30 of base 20 are sloped or beveled at an angle α, which in the preferred embodiment is a slope of approximately 10°. The function of the sloped side walls is described more thoroughly below, but generally stated, the side walls frictionally engage cooperatively sloped or beveled side walls of the retaining clip 50 when the clip is assembled with the hook such that the clip encircles the base of the hook to thereby confine the cord within the passageway through the hook.

With reference to FIGS. 3, 5, 6 and 7, the bottom or lowermost surface 40 of hook 12 includes a raised platform 42 that protrudes away from surface 40. In the embodiment shown in FIG. 3, platform 42 is rectangular. In the embodiment shown in FIGS. 5 and 6 platform 42 is circular. As detailed hereinafter, the particular shape of platform 42—rectangular or circular or other—is dictated by the shape of a corresponding recessed area formed in end cap 100 into which the platform is received when the hook is in a nested position in the end cap.

Hook 12 may be manufactured in various sizes to accommodate various uses. In addition, the size of the hook may be varied relative to the size of the base. However, regardless of the particular size of the hook and/or the base, platform 42 is formed in a size such that the platform will be received into the recessed area in the end cap.

As may be best seen in FIG. 7, which is a sectional view through the entire hook, the hook end of the hook and the shank generally lie in a single plane, which may be defined as the longitudinal plane shown in the sectional view of FIG. 7. The channel 32 through the base of the hook defines a longitudinal axis extending through the base of the hook. In the preferred embodiment, the longitudinal axis through the base defined by channel 32 is parallel to the plane defined by the hook, as described above.

Figure 13:
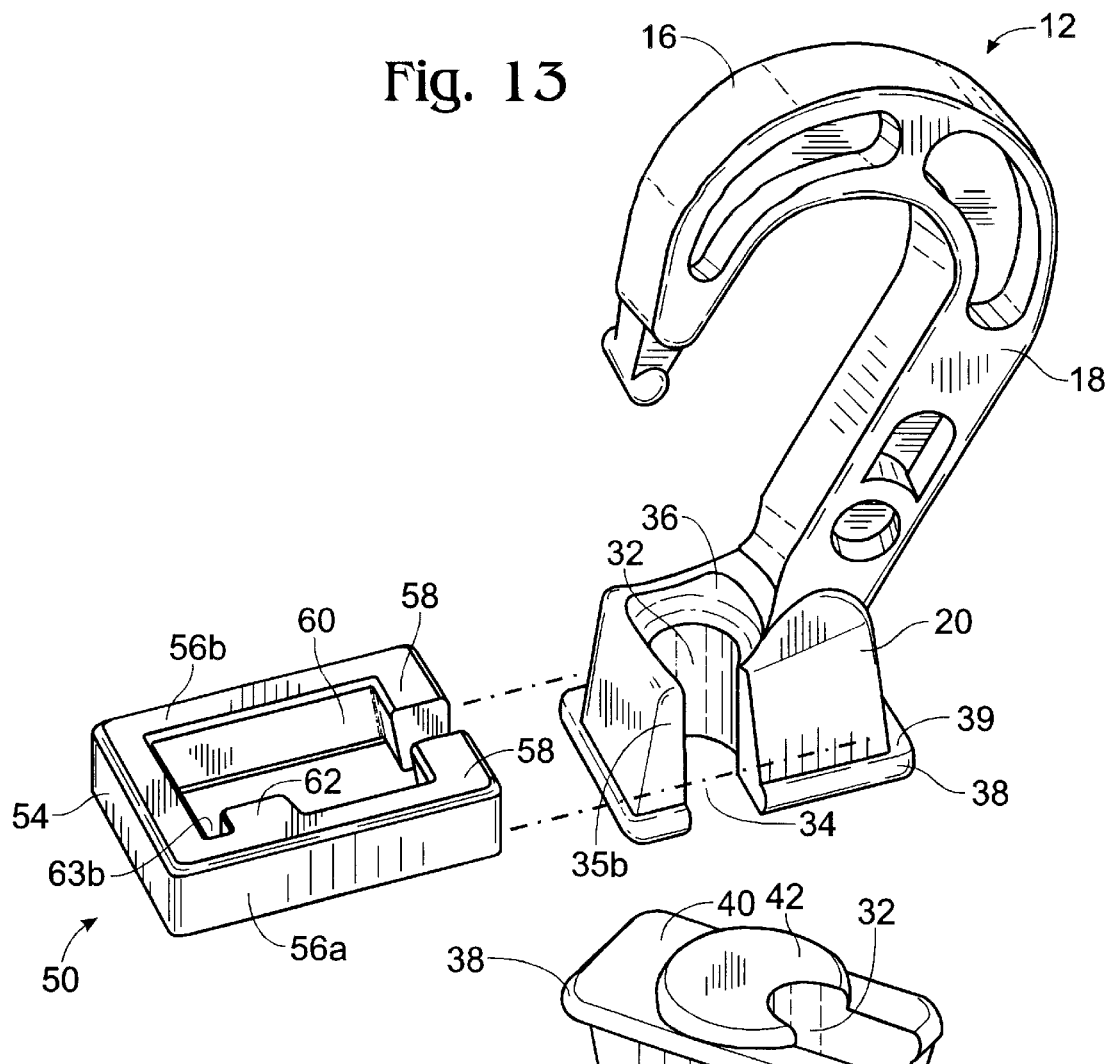
FIG. 13 is a top exploded perspective view of an alternative embodiment of the hook and clip of the present invention.

The location of the channel formed through base 20 may be varied as shown in FIG. 13. In that figure, the lateral opening 34 into channel 32 is formed through a different wall portion of base 20 than the embodiment shown in FIG. 1. In the embodiment shown in FIG. 13 the associated clip 50 includes a tab 62 that has been positioned on the interior surface 60 of wall 56a in a position to correspond to the location of lateral opening 34. As with the embodiment of FIG. 1, tab 62 shown in FIG. 13 is positioned such that when the clip is positioned around the base the tab closes the lateral opening into channel 32, defining an open longitudinal passageway through the base having open opposite ends. Cord 14 extends through the passageway. When the clip is in place, the clip prevents the cord from moving laterally out of the passageway.

Figure 14:
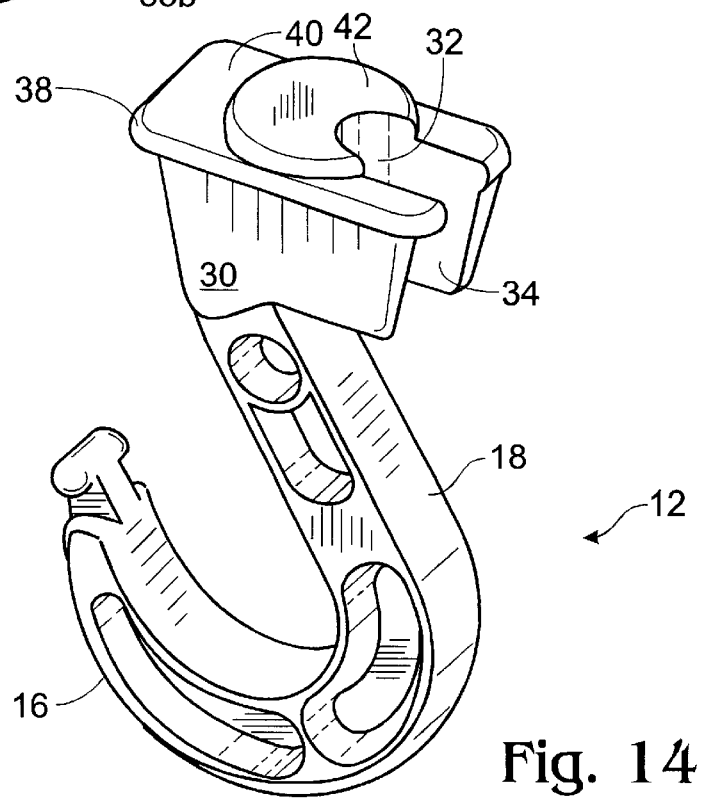
FIG. 14 is a bottom perspective view of another alternative embodiment of a hook according to the present invention.

The spatial orientation of the hook 12 relative to the base 20 may be varied. For instance, in FIG. 14, which illustrates an alternative embodiment of the orientation of the hook relative to the base, hook end 22 of hook 12 is shown such that channel 32 is oriented on opposite side of the hook as that shown in FIG. 1. In addition to the orientation of the hook shown in FIG. 14, which illustrates a rotation of the hook of 180° about the longitudinal axis generally defined by channel 32, the hook may be rotated relative to the base by any amount, such that the hook may be positioned in intermediate positions along this axis. Further, the hook may be tilted relative to the base such that the longitudinal axis defined by the hook is canted relative to the longitudinal axis defined by channel 32.

The shape of base 20 shown in FIG. 1 is generally rectangular. However, the shape of the base may be varied. For instance, the base of the hook could be square or round.

Clip 50

The securement system of the present invention may be utilized with at least two different embodiments of retaining clips, the function of which is described below, but which may generally be stated to be to encircle or engage the base 20 of hook 12 and to occlude the lateral opening into channel 32 to define a passageway through the clip having open opposite ends. Stated otherwise, clip 50 functions to close lateral opening 34 into channel 32, thereby defining a passageway through the base of the hook having open opposite ends.

A first embodiment of a clip 50 is shown in FIGS. 1, 2, 3 and 5. This embodiment shows a "split clip" which includes an opening 52 in one end of the clip defining a lateral opening into the interior of the clip. The second embodiment of clip 50 is shown in FIG. 8. This second embodiment is identical to the first embodiment except that it lacks the opening 52 in one end of the clip and therefore does not have a lateral opening into the interior of the clip.

Clip 50 is preferably manufactured of a plastic material identical to hook 12, although like hook 12 it may be made of other materials such as nylon or metal. The clip may also be formed of one material and the hook formed of a different material. As with hook 12, the particular material selected for clip 50 will depend upon the particular application that the clip is being used for.

Clip 50 illustrated in FIG. 1 generally defines a rectangular member having a base wall 54, two opposite side walls 56a, 56b, and an end wall 58 opposite base wall 54. In the first embodiment of clip 50—that is, the embodiment shown in FIGS. 1, 2, 3 and 5, an opening 52 is formed in base wall 58 at about the mid-point along the length of the base wall. Clip 50 has an open interior defining a rectangular opening, which is defined by interior surfaces 60 of the walls of the clip.

As noted above, the shape of base 20 may be other than the generally rectangular shape shown in the Figures. As will be appreciated, whatever the particular configuration of base 20, the open interior of clip 50 that is used with the base will be formed in a cooperative shape so that the clip may encircle and engage the base.

Figure 2:
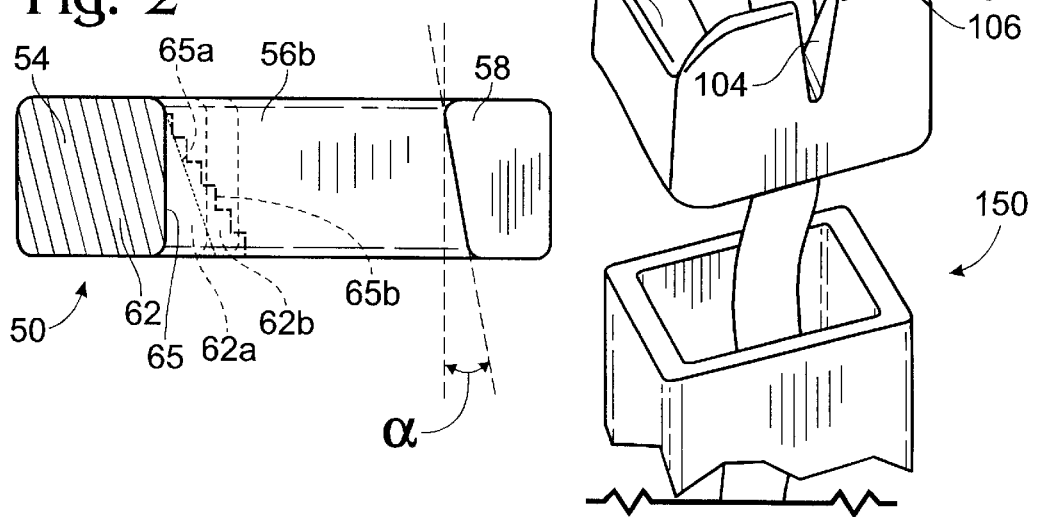
FIG. 2 is a cross sectional elevational view of a clip of the present invention taken along the line 2—2 of FIG. 1.

A tab 62 may formed on the interior surface of base wall 54. Tab 62 extends into the open interior from the clip and projects inwardly toward end wall 58 to define two leg-receiving slots 63a, 63b, one on either side of the tab. When clip 50 is in position around the base 20 of hook 12 (FIG. 4), tab 62 extends partially into channel 32 in the base of the hook and legs 35a and 35b are received into the leg-receiving slots 63a and 63b, respectively, thereby closing the lateral opening 34 into channel 32 and thus defining a longitudinal passageway through hook 12 through which cord 14 extends, as shown in FIG. 1. The passageway thus formed has open opposite ends with no lateral opening into the passageway. The face or wall portion of tab 62 that faces channel 32 when clip 50 is in position around the base of the hook is identified with reference number 65 (FIG. 2). As illustrated in FIGS. 3 and 5, the width of tab 62 is slightly less than the width of the lateral opening into channel 32 such that tab 62 is received into the lateral opening.

Figures 16, 17:
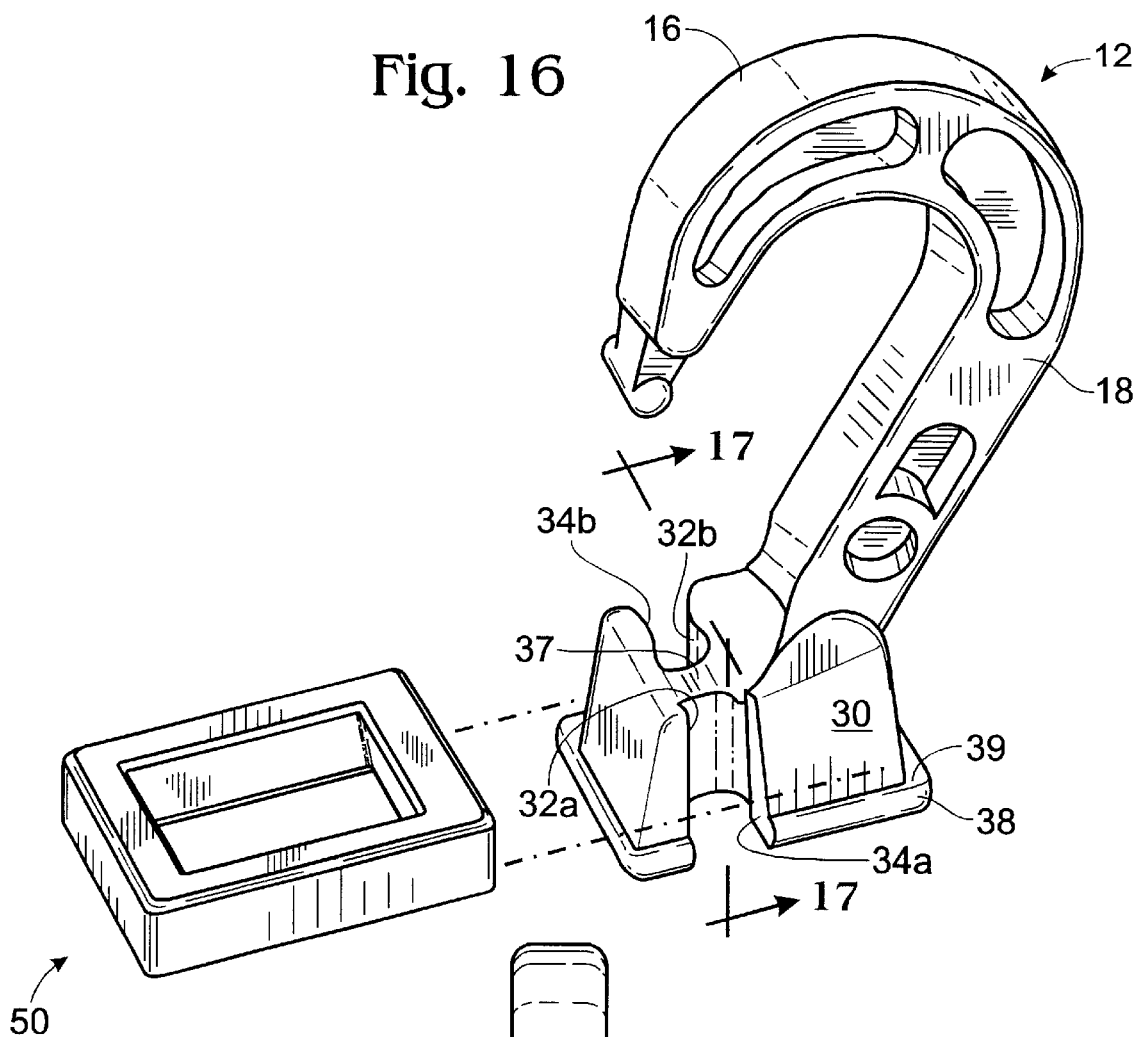
FIG. 16 is a top exploded perspective view of yet another alternative embodiment of the hook and clip of the present invention.
FIG. 17 is a cross sectional elevational view taken along the line 17—17 of FIG. 16.

The length of tab-62 may be varied to effectively vary the diameter of the passageway through hook 12 when the clip is assembled with the hook. Increasing the length of tab 62 will result in a corresponding decrease in the dimension of the passageway. Stated otherwise, increasing the length of tab 62 moves wall 65 further into channel 32 when the clip is assembled with the hook as shown in FIG. 4, thereby effectively reducing the diameter of the channel. Conversely, decreasing the length of tab 62 will result in a corresponding increase in the dimension of the passageway. Furthermore, as shown in FIG. 16, the tab may be eliminated. By selectively increasing or decreasing the length of tab 62 and thereby selectively and correspondingly increasing or decreasing the dimension of the passageway, hook 12 may be adapted to accept different sizes of cord 14.

The varying lengths of tab 62 are illustrated in FIG. 2 with the dashed lines showing reference numerals 62a, 62b. In use, the clip that is used will depend upon the particular size cord 14. Further, the inwardly facing wall 65 of tab 62 may be angled as illustrated in FIG. 2 with the dashed line labeled 65a, or formed in a stair-step fashion as shown with 65b.

As best illustrated in FIGS. 1, 2 and 4, the interior walls 60 of clip 50 are sloped or beveled at an angle $\alpha$, which in the preferred embodiment is approximately 10°. All of the interior walls 60 of clip 50 are formed at the same angle $\Delta$ with the exception of the three side walls of tab 62 (except as noted above in those instances when the wall 65 is sloped). As shown in FIGS. 1 and 7, and as noted above, the sloped side walls 30 of base 20 of hook 12 are similarly sloped at an angle $\alpha$, which is the same as the angle of the interior walls of clip 50. As shown in various Figures in which the clip is illustrated in position on hook 12, and particularly in FIG. 11, it will be appreciated that the interior walls of clip 50 are sloped in the opposite direction from the sloped side walls 30 of base 20 to facilitate frictional mating between the surfaces of the side walls of the base and the interior walls of the clip. Regardless of the particular angle of the slope of side walls 30, the interior surfaces of clip 50 that mate with the side walls will be sloped at the same angle with the appropriate orientation.

Figure 11:
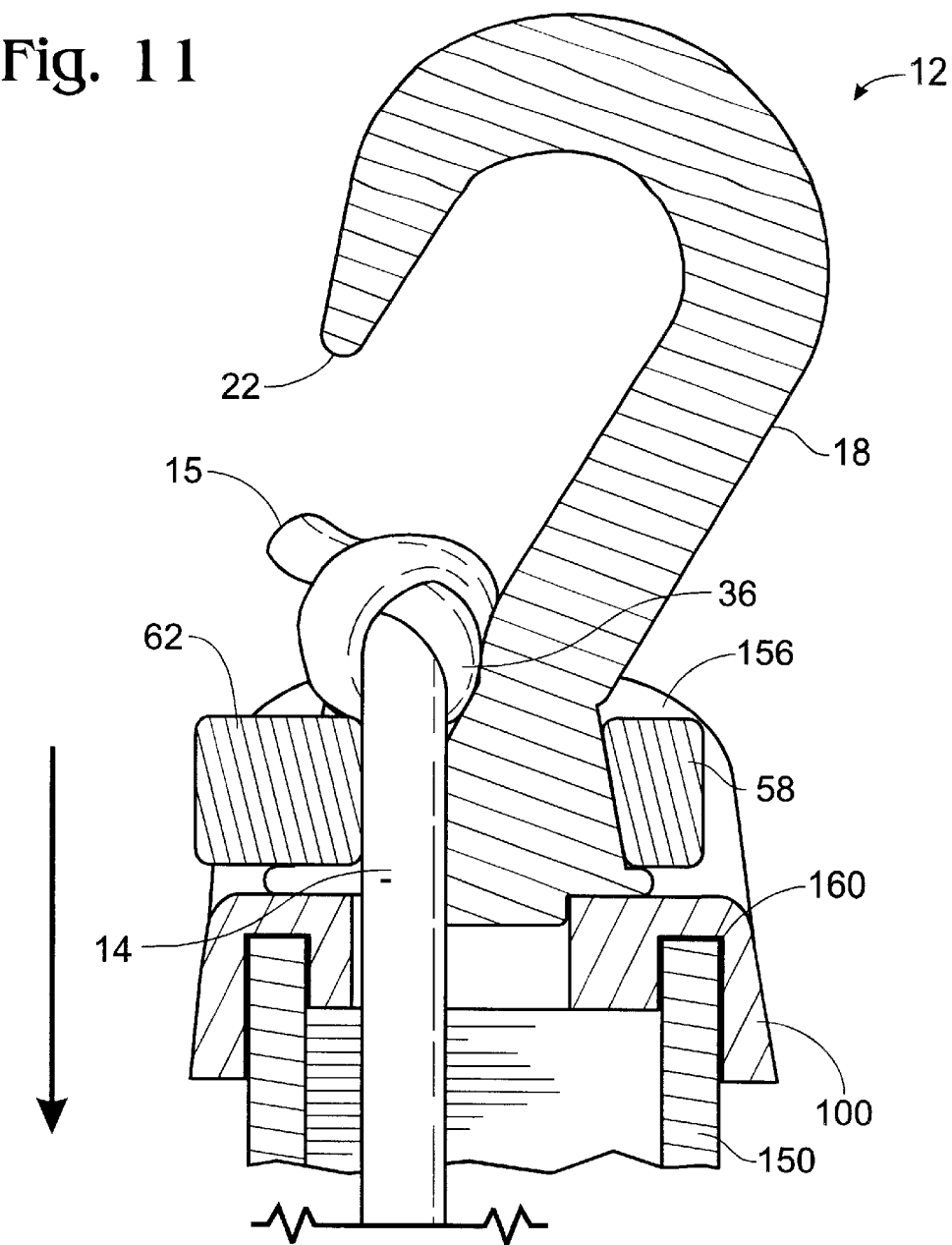
FIG. 11 is a cross sectional view of the assembled securement system illustrated in FIG. 1.

As best shown in FIGS. 4 and 11, clip 50 is assembled with hook 12 such that the clip fits around base 20 and side walls 30 with tab 62 extending partially into opening 34 to channel 32 and with legs 35a and 35b received into leg-receiving slots 63a and 63b, respectively. When clip 50 is in this position on hook 12, tab 62 occludes lateral opening 34, thereby closing the lateral opening into channel 32 but defining a longitudinally open passageway through the combination of the hook and the clip having open opposite ends, as noted above.

Clip 50 is assembled onto hook 12 by inserting the hook end 22 of the hook through the open interior of clip 50. Clip 50 must of course be oriented relative to hook 12 such that when the clip is assembled with the hook the sloped walls of the clip orient properly with the sloped side walls of the base of the hook—that is, as shown in FIG. 11, in such a manner that the side walls, which slope in opposite directions, mate. The clip is sized so that the interior walls of the clip mate with the sloped side walls of the base. Because the interior walls 60 of clip 50 are sloped or beveled at the same angle $\alpha$ as the slope of side walls 30 of base section 20, the clip frictionally engages the sloped side walls of the base of the hook when the clip is assembled onto the hook. As shown in FIGS. 4 and 11, when the clip is in the assembled position on hook 12, the lowermost surface 51 of clip 50 lies adjacent to or abuts outwardly projecting lip 38, although there is no need for the lowermost edge of the clip to actually contact the lip. The frictional engagement between the clip and the hook is sufficient to prevent the clip from moving out of the position shown in FIG. 11, even when significant force is applied to the clip in the direction of the arrow in FIG. 11. As such, the projecting lip 38 is an optional feature. The projecting lip does nonetheless provide a secondary restraint against the clip moving downwardly over the base of the hook in the direction of the arrow in FIG. 11.

As illustrated in FIG. 4, when clip 50 is assembled with hook 12 the uppermost inner edge 47 of the clip lies adjacent to and beneath flange 44. Since clip 50 is somewhat resilient, when it is assembled onto the hook the clip snap fits under the flange. Therefore, flange 44 functions as a stop to prevent the clip from moving out of engagement with the hook in the upward direction (i.e., the direction opposite the arrow in FIG. 11). This insures that the clip will remain in engagement with the hook in normal operating conditions. Flange 44 is an optional feature. Nonetheless, it will be appreciated that the stop function of the flange could be accomplished with any number of equivalent structures for the flange. Again, because the clip is somewhat resilient, it may be disassembled from the hook but disassembly requires that the clip be moved over the engagement with the flange with some amount of force.

While the preferred angle α is about 10°, the angle may be varied widely. Nonetheless, the angle α is the same for both the side walls 30 of hook 12 and the interior walls 60 of clip 50, although the direction that the walls of each component are sloped is opposite of one another, as discussed above.

In addition, although not shown in the Figures, an optional retaining clip may be used with clips 50 having an opening 52, as shown in FIGS. 1 and 2. The retaining clip is removable and extends across opening 52 to join the two sides of the passageway together. Although clip 50 is sufficiently strong to prevent the opposite side walls 56a and 56b from separating, even when pulled apart, the optional retaining clip provides added security.

End Cap 100

Figure 9:
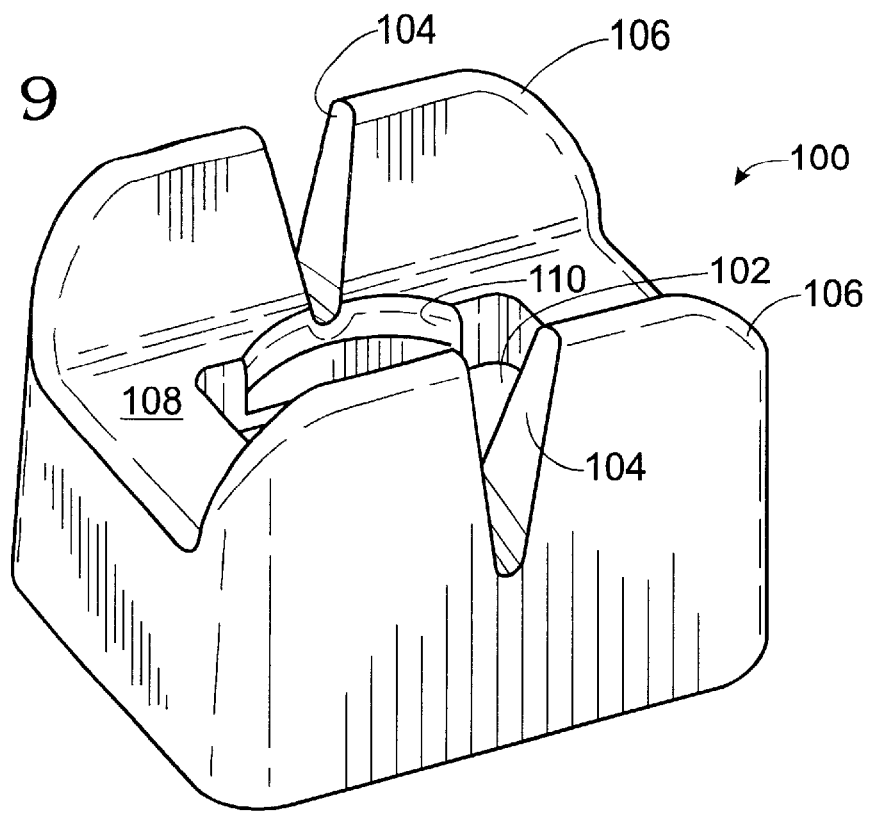
FIG. 9 is a top perspective view of a first embodiment of an end cap according to the present invention.
Figure 10:
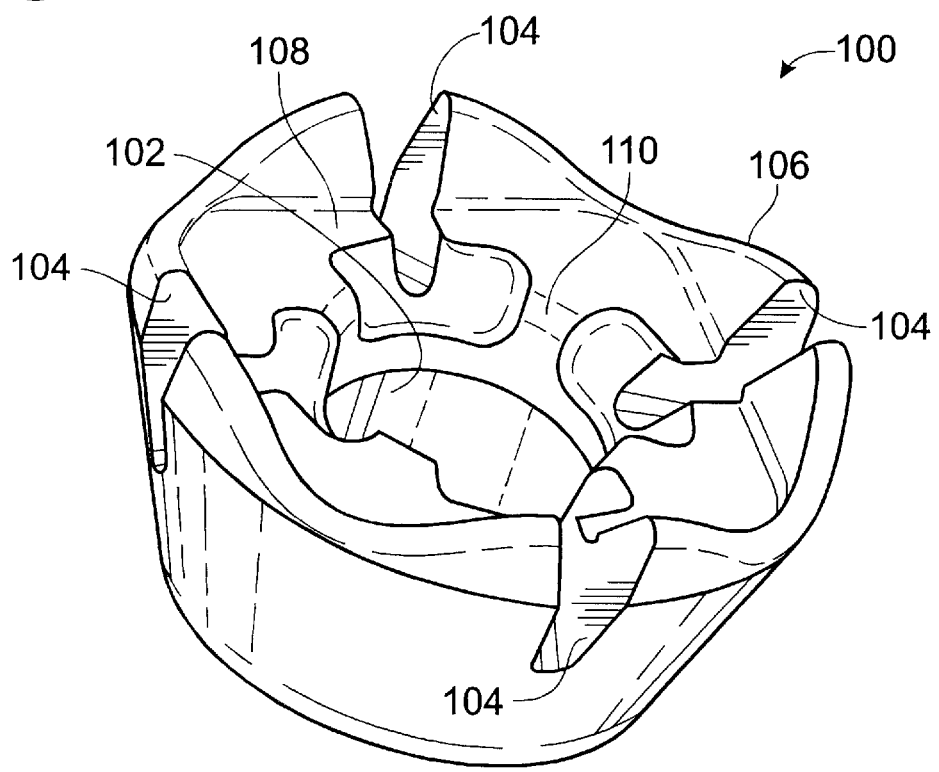
FIG. 10 is a top perspective view of a second embodiment of an end cap according to the present invention.

Two embodiments of end cap 100 are shown in FIGS. 9 and 10, respectively. The particular embodiment of an end cap used in any particular situation depends upon the cross sectional configuration of the tubular structural member 150 with which the securement system is being used (FIG. 1). For example, structural member 150 in FIG. 1 is rectangular in cross section. Accordingly, end cap 100, which is attached to an end of member 150, is of like configuration, as shown in FIGS. 1 and 9. However, when structural member 150 is, for example, round in cross section, an end cap having a round cross sectional configuration is used, as shown in FIG. 10. Moreover, the particular shape of the end cap is not dependent upon the cross sectional configuration of the structural member. For example, a round end cap such as that illustrated in FIG. 10 could be configured for use with a structural member having a square cross section.

With reference to FIG. 9, end cap 100 is designed and sized to engage and fit over or into the end of the structural member. The end cap may be attached to the end of the structural member in any well-known manner, for instance with a pressure fit collar that engages the structural member either internally or externally, or both, or with an appropriately sized peripheral channel formed in the cap, or with a threaded segment that is threaded into the structural member. In FIG. 11 the end cap is shown attached to the end of the structural member with a peripheral channel that forms a slot for receiving the end of the structural member. If desired, end cap 100 may be secured in place on the end of the structural member with a screw.

An open passageway 102 extends through the interior of end cap 100 in such a position that passageway 102 aligns with the hollow interior of the tubular structural member when the end cap is in place on the end of the member (FIG. 11). As detailed below, passageway 102 allows cord 14 to pass from the tubular member through the end cap. Furthermore, many standard commercially available bungee-type cords include hooks that have a coiled base that include a passageway through which the cord extends. An end of the cord is inserted through the passageway through the coiled base and is crimped in a folded-over position to form an enlarged portion. The enlarged portion is larger than the diameter of the passageway so the end of the cord is unable to move through the passageway, thereby connecting the cord to the hook. The passageway 102 through end cap 100 is sized to accept the coiled base section of most commercially available bungee type cords having coiled bases, so,the end cap may be used with such cords.

One or more V-shaped notches or grooves 104 are formed around the periphery of the end cap in an outwardly projecting flange 106. The end cap shown in FIG. 9 includes two V-shaped notches 104 positioned on opposite sides of the end cap in flange 106. In the embodiment shown in FIG. 10 there are four V-shaped notches 104 positioned around the periphery of the end cap in flange 106. The number and positions of the V-shaped notches is not critical and depend upon the shape of the end cap. The apex of the V-shaped notches, which for purposes herein is defined as the culmination of the two sides of the V, is sloped in the direction from the interior of the end cap toward the exterior, and in the direction from the uppermost edge of flange 106 to the lowermost edge of the end cap. The sloping apex and the direction in which it slopes, may best be seen in FIG. 12, and may also be seen in FIGS. 9 and 10. The size of the V-shaped notch is variable depending upon factors such as the relative size of cord. Thus, while a single sized V-shaped notch will anchor multiple sizes of cord, when for instance a very large cord is being used, a relatively larger V-shaped notch may be used.

The inner-facing surfaces of the V-shaped notches may be modified to provide more frictional resistance between the cord and the end cap. For instance, the surface may be roughened or grooved.

The portion of the end cap located inward of flange 106 defines a flattened base region 108 surrounding passageway 102. A recessed peripheral shoulder 110 is formed around the outer marginal end of passageway 102 adjacent flattened region 108 and in position to received the platform 42 on the bottom surface 40 of hook 12 when the hook is positioned adjacent the end cap, as best illustrated in FIG. 11. The position of the peripheral shoulder 110 is such that hook 12 is centered on the end cap when platform 42 is received within shoulder 110, and bottom surface 40 of the clip rests on the flattened base region 108. The peripheral shape of shoulder 110 is made to match the peripheral shape of the platform 42 on the hook that is used with the end cap. Thus, if a hook such as that shown in FIG. 3 with a rectangular platform 42 is used, the end cap would have a rectangular shoulder 110 sized to receive platform 42.

Assembly

FIG. 11 shows a cross sectional view of the assembled securement system. The securement system is assembled by first selecting a clip 50 having a tab 62 with a length appropriate for the diameter of the particular cord 14 that is being used. For example, bungee cords are available with various cross sectional diameters; the larger the size of the cord, the stronger the cord tends to be. Thus, larger cords are used to secure larger loads. A clip 50 having a opening 52 into the clip (FIG. 1), or a clip 50 as shown in FIG. 8 may be used, depending upon the particular application.

Cord 14 extends through the hollow interior of the tubular structural member 150. The end of cord 14 opposite the securement system shown in FIG. 1 is fixed, either to the structural member itself or, for example, at a second securement assembly located at the opposite lateral end of the structural member. For example, if the structural member 150 is a cross bar for a car-top rack, each end of the structural member could be fitted with the combination of an end cap 100, a hook 12 and a clip 50. If the interior of structural member 150 is rough or may be prone to abrade cord 14, a smooth liner or sleeve may be inserted into the interior of the structural member to prevent abrasion of the cord.

In some instances, end 15 of cord 14 will be located in the internal portion of the structural member, inwardly of the end cap, when the cord is in a resting or non-extended position. In this instance a pull-string may be attached to the end of the cord and extended outwardly through the end cap to allow the cord to be pulled outwardly when desired.

End 15 of cord 14 extends out of structural member 150 and through passageway 102 in end cap 100. The exposed portion of cord 14—that is, the section of cord 14 external to structural member 150 and end cap 100, is inserted laterally into channel 32 through the lateral opening 34 into the channel. Alternatively, if a free end 15 of the cord is available, the free end may be threaded through the channel. The selected clip 50, having as noted above a tab with a length appropriate for the selected cord 14, is then looped over the hook end 22 of hook 12 in the manner described above, and is moved along the length of the hook in the direction of base 20. The cord is then inserted into the open interior of the clip by either passing the cord through lateral opening 52, or by inserting end 15 of cord 14 into and through the open interior of clip 50. The clip is then seated on base 20 as shown in FIGS. 4 and 11. When clip 50 is in this position on base 20, the clip closes the lateral opening into channel 32, thus capturing cord 14 within channel 32 and preventing the cord from moving laterally out of the passageway defined by channel 32. The cord is then pulled through channel 32 to the desired length and a knot as shown in FIGS. 1 and 11 is formed at the desired position, which in FIGS. 1 and 11 is shown near the terminal end 15 of cord 14. Alternatively, a mechanical stop could be fixed to the cord at the desired position. The desired length of cord that determines where the cord will be knotted typically would be an amount sufficient to provide some amount of tension to be exerted on the cord in the direction of the arrow in FIG. 11. However, in some instances it might be desirable to have a greater length of cord external to the tubular structural member, for instance when the cord will extend a relatively greater distance outward of the structural member.

Alternatively, the cord may be inserted into the open interior of the clip—either by passing the cord through lateral opening 52, or by inserting the end of the cord into and through the open interior of the clip—and the combination of the clip and cord are then assembled with the hook as described above.

In many instances it is desirable to utilize a pre-knotted cord. That is, a cord having knots formed in selected locations. With such a cord the hook of the present invention may be positioned at a desired location on the cord, with the cord inserted laterally into channel 32 as described, prior to assembling the clip onto the hook.

As shown in FIG. 11, when there is tension exerted on the cord in the direction of the arrow in the Figure, the knot in the cord seats on the concave shoulder 36 formed near the uppermost limit of channel 32. The combination of the concave shoulder 36 and tab 62 forms a stop that prevents the knot from moving longitudinally through the passageway in the direction of the arrow, even when a great deal of tension is applied to cord 14. Because clip 50 is frictionally fixed to base 20 with the sloped interior surfaces of the side walls of the clip mating with the sloped side walls of the base, the clip can not move in the direction of the arrow in FIG. 11. The combination of the clip and the base of the hook thus function as a stop for the end of the cord, restraining movement of the cord relative to the hook. However, when tension is relieved from cord 14 the clip may be removed from its assembled position on hook 12 to thereby release cord 14 from the assembly and to remove the cord from the hook.

If a clip 50 having a sloped wall 65a or stair-stepped wall 65b (FIG. 1) is used, the knot in the cord will seat on the concave shoulder 36 in a relatively lower position relative to the base than with the clip 50 described above.

The side walls 56a and 56b of clip 50 are somewhat resilient and may be spread apart slightly to increase the size of opening 52 through end wall 58 to thereby allow a cord to be passed laterally through opening 52. However, the side walls are stiff enough that clip 50 must be assembled with hook 12 in the manner described above.

With the securement system assembled as shown in FIG. 11, the hook is seated in end cap 100. Because cord 14 is elastomeric, hook 12 may be pulled outwardly away from end cap 100, thereby stretching cord 14. Cord 14 may then be laterally inserted into a selected one of the V-shaped notches 104 in end cap 100. The V-shaped notches 104 function as anchor points or pinch points for fixing the cord relative to the notch.

Figure 12:
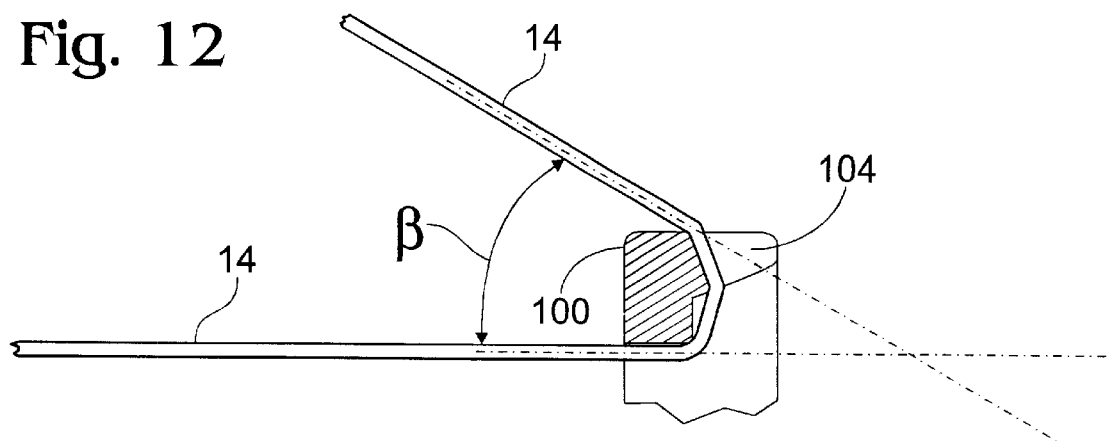
FIG. 12 is a schematic representation of an elastic cord seated in an end cap of the present invention.

With reference to FIG. 12, if the longitudinal axis defined by cord 14 when in tubular structure 150 is defined as the 0° reference angle, then the V-shaped notches will anchor the cord and restrain its movement relative to the notches when the cord is inserted into a V-shaped notch and the cord is angled relative the 0° reference angle by any angle β, which is defined as the anchoring angle. Angle β will vary with such factors as the amount of tension applied to the cord, the size of the cord relative to the size of the V-shaped notch, and the relative materials that the cord and the end cap are made of. However, in most instances the cord will be anchored in the V-shaped notch when anchoring angle β is less than about 75° from the 0° reference angle. Furthermore, once the cord is anchored in the V-shaped notch it will tend to stay anchored in the notch without the need to reset the anchor even if the angle β is changed. Although not shown in FIG. 12, a hook 12 would be attached to the end of cord 14, and the hook would in turn be attached either directly or indirectly to an item of cargo.

With cord 14 inserted into a V-shaped notch, the cord is anchored at the point where it is inserted into the notch. As tension is applied to the cord by pulling on hook 12, the cord remains anchored in the V-shaped notch provided the angle at which the cord is deflected is less than about 75° from the 0° reference angle. This allows the hook to be pulled under tension to a desired position and attached either directly to an item of cargo, or indirectly to cargo and other parts of, for instance, a vehicle and or the rack. The V-shaped notches allow for a high degree of flexibility in the length of cord that is extended outwardly from the tubular member, and thus flexibility in the amount of tension that is applied to the cord.

In most instances the cargo that is being secured to the structural member is located on the structural member at a point inwardly from the securement assembly. For instance, consider the case where the structural member is a crossbar of a roof top rack for an automobile and the cargo is a bicycle. In that case the bicycle could be positioned anywhere between the two opposite ends of the crossbar. By inserting cord 14 into a selected V-shaped notch and connecting hook 12 to the bicycle the cord is typically deflected at an angle of less than about 75° from the 0° reference angle. As such, the cord will be anchored in the V-shaped notch. It will be appreciated that in most instances the cargo that is being secured will be located at such a position that the cord may be thus anchored in a V-shaped notch before the hook is connected to the cargo.

The components of the present invention are well suited to be used in various alternative uses. For example, the hook 12 and clip 50 may be used in situations where it is desirable to connect a hook to a cord that has both ends fixed. In this instance a clip 50 having a opening 52, as shown in FIG. 2, must be utilized. With both ends of a cord 14 fixed, hook 12 is positioned at a selected position intermediate between the two fixed ends. The cord is passed laterally into channel 32 through the lateral opening 34. Similarly, the cord is then passed laterally through opening 52 of clip 50, which has been oriented relative to the clip so that the clip will seat properly on the hook, and which has been selected with a tab 62 of the length appropriate for the size of the cord. With the cord extending through the open interior of the correctly oriented clip, the clip is then looped over the hook as described above and moved along the length of the hook until the clip is seated on the base of the hook with the cord entrapped in channel 32. The hook may be disengaged from the cord by removing the clip from its engaging position on the hook and removing the cord through the thus open lateral opening 34.

In most instances a cord having both ends fixed will not have intermediate knots formed therein that would seat in concave shoulder 36 of hook 12. Of course, if such a knot is present then it may be used to fix the position of the hook relative to the cord. But if such knots are not present and it is desirable to fix the position of the hook relative to the cord, stops may be affixed to the cord in a position such that the stop rests in concave shoulder 36. A stop also could be affixed to the cord on the opposite side of the hook adjacent the bottom surface of the base.

The ability to place the hook of the present invention at any point along a cord intermediate between two fixed ends is advantageous in many applications. As one example, the present hook may be used with drop cloths and tarpaulins that include grommets with a cord running through the grommets, and being fixed on opposite ends.

As yet another alternative, multiple cords may be installed with the securement apparatus shown in FIG. 1. For instance, two or more cords 14 may be placed within the interior of structural member 150 such that they lie parallel to the single cord 14 shown in FIG. 1, and such that they extend through end cap 100. A hook 12 may be attached to the terminal end of any one or more of such cords, but of course when more than one cord extends through end cap 100, none of the hooks will seat as shown in FIG. 11.

Figure 15:
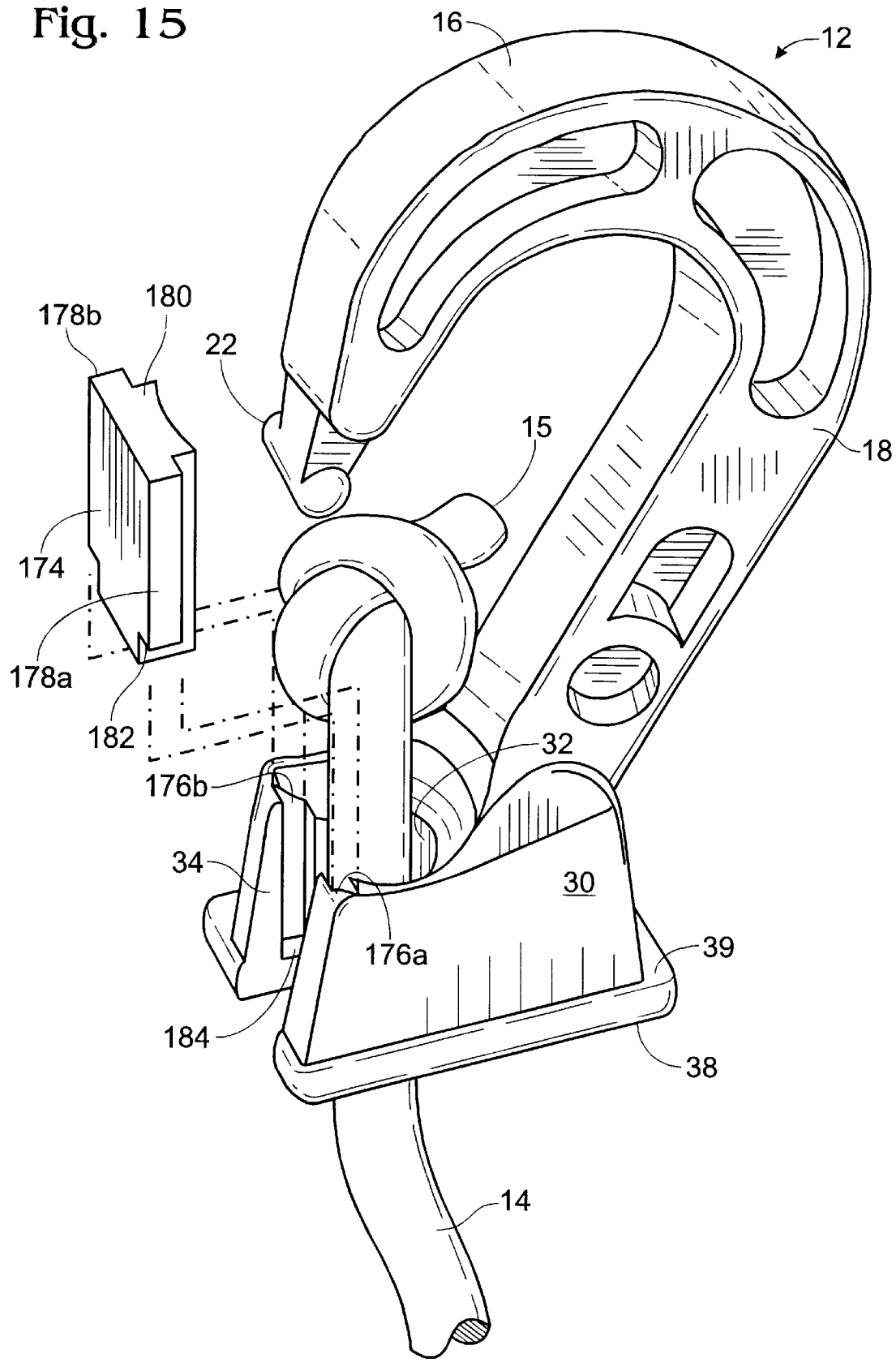
FIG. 15 is a top exploded perspective view of another alternative embodiment of the hook and clip according to the present invention.

An alternate embodiment of a hook and clip according to the present invention is shown in FIG. 15. In that embodiment, channel 32 through the hook includes a lateral opening 34 into the channel. The clip, however, is formed as a gate 174, which is configured to slide into a pair of slots 176a, 176b formed in the base of the hook on opposite inner sides of lateral opening 34. When the gate is slid into the slots, the gate closes the lateral opening 34 into channel 32 to thereby define a longitudinal passageway through the hook having open opposite ends. Gate 174 includes opposite outwardly projecting arms 178a and 178b, each having a shoulder 182 formed near the lowermost portion of the arm, and a tab 180.

The hook and clip embodiment illustrated in FIG. 15 is assembled by inserting gate 174 into the hook such that the outwardly projecting arms 178 are slid into slots 176. The gate is slid downwardly into the slots until shoulders 182 abut cooperative stepped shoulders 184 in the slots formed near the lowermost portion of the channels. When the gate is thus assembled with the hook the gate occludes the lateral opening 34 into channel 32 to define a passageway through the hook having open opposite ends. The abutting shoulders 182 and 184 form a stop that prevents the gate from moving downwardly relative to the hook, even when tension is applied to a cord contained in the passageway through the hook. Although not shown in FIG. 15, as discussed above with reference to flange 44, a similar stop mechanism could be included with the embodiment of FIG. 15 to prevent the gate from moving out of its assembled position with the hook.

Tab 180 on gate 174 extends partially into channel 34 and thus defines the diameter of the passageway through the hook. The size of tab 180 may be varied as described above to accommodate cords of varying sizes.

It will be appreciated that with the embodiment of FIG. 15, the cord may be inserted laterally into channel 32 prior to the assembly of the gate with the hook, which entraps the cord in the thus-formed passageway. Alternately, a free end of a cord may be threaded through the passageway formed when the gate is in place, with the free end of the cord then being knotted to prevent it from moving back through the passageway.

The hook of the present invention is not limited to having a single passageway formed through the base for accommodating the cord. For instance, the embodiment of the hook and clip shown in FIGS. 16 through 19 includes a pair of channels through the base such that the cord may be looped over the base. Specifically with reference to FIG. 16, hook 12 includes two channels 32a and 32b located on opposite sides of base 30. Each of these two channels is laterally open along the entire length of the channel through lateral openings 34a and 34b, respectively. The two channels 32a and 32b define a bridge 37 extending between the two channels. In FIGS. 16 through 19 the two channels 32a and 32b are located directly opposite one another on opposite sides of the base of the clip. However, the channels could be offset from one another if desired.

Referring to FIG. 17 it may be seen that the uppermost surface of bridge 37 between channels 32a and 32b is rounded. As described below, the cord runs over this uppermost surface when the hook is assembled with the cord. However, the uppermost surface of the bridge may also be formed into an upwardly projecting apex. A recessed notch 41 is formed in the lowermost surface of base 30 and surrounding channel 32b. The recessed notch is configured for receiving the knotted end of the cord.

When clip 50 is assembled onto hook 12 as shown in the dashed lines in FIG. 17 the clip closes the lateral openings 34a and 34b into channels 32a and 32b, thereby defining a pair of passageways through the hook, each passageway being laterally closed but being longitudinally open and having open opposite ends. Referring to FIG. 18 (in which the clip is omitted) it will be appreciated that prior to assembly of the clip with the hook, cord 14 may be inserted laterally into channel 32a through lateral opening 34a, looped over bridge 37, then inserted laterally into channel 32b through lateral opening 34b. The free end of the cord (not shown) may then be knotted and clip 50 may be assembled onto the hook (FIG. 17). Because clip 50 closes the lateral openings into the channels, the clip thus entraps the cord in the two passageways. The knotted end of the cord is at least partially received into notch 41. The combination of the knotted cord bearing against the lower surface of the base and the binding effect of the cord as it makes a 180° turn over bridge 37 prevents the cord from being pulled out of the hook when tension is applied to the hook in the direction of the arrow in FIG. 18.

Referring to FIG. 19 (again shown with the clip omitted), with the embodiment of hook shown in FIG. 16 it may be seen that the cord 14 may be oriented on the hook such that the cord is inserted into channel 32a through lateral opening 34a, looped around the back side of the hook as shown in the Figure, then inserted into channel 32b through lateral opening 34b.

Alternate Embodiments

Figure 20:
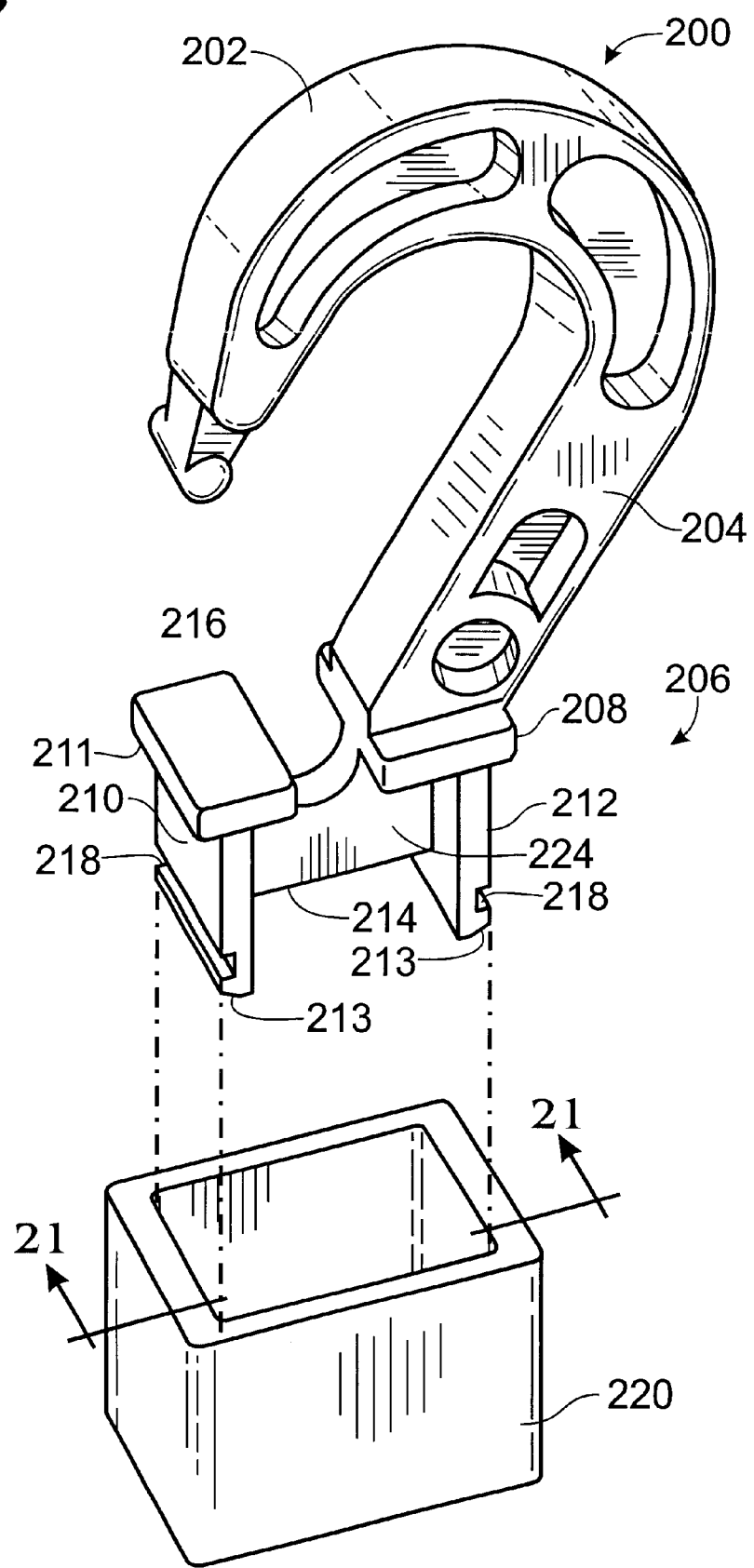
FIG. 20 is a top perspective view of an alternate embodiment of the hook and clip of the present invention.
Figure 22:
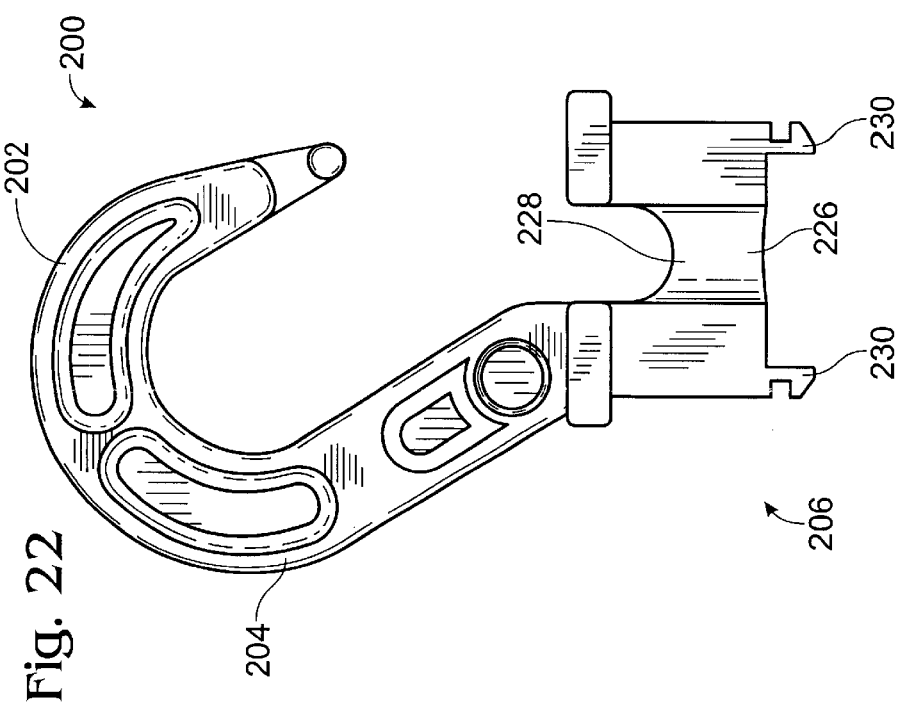
FIG. 22 is yet another alternate embodiment of a hook according to the present invention.
Figure 21:
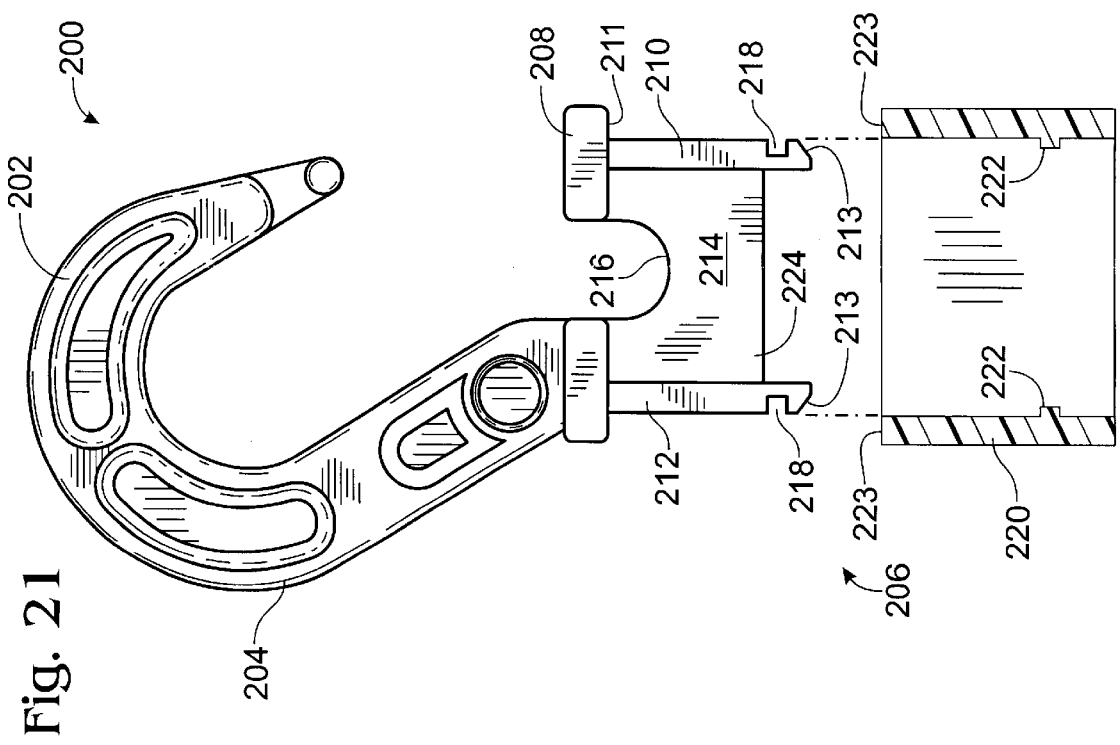
FIG. 21 is a side elevational view of the hook and clip shown in FIG. 20, with the view of the clip shown in cross section taken along the line 21—21 of FIG. 20.

Two alternate embodiments of a hook 200 according to the present invention are shown in FIGS. 20 through 22. With reference to FIG. 20 a hook 200 includes a curved section 202, an adjacent shank 204 and a base section 206. Base section 206 includes a peripheral shoulder 208 that extends generally around the upper portion of the base. A forward plate 210 depends downwardly from the lower surface 211 of shoulder 208 below the "front" end of the hook. Likewise, a rearward plate 212 depends downwardly from the lower surface of shoulder 208 below the "rear" end of the hook. The lowermost, outward edges of plates 210 and 212 are tapered at edges 213. A connecting plate 214 extends between forward plate 210 and rearward plate 212 and interconnects the two plates in the manner of an I-beam type of construction. A saddle 216 defines a cord-receiving saddle adjacent the forward end of shank 204 where it joins with the base section 206.

Each of forward and rearward plates includes a recessed portion 218 extending across the outwardly facing surfaces of the plates.

Referring now to FIG. 21 it may be seen that clip 220 engages hook 200 from the lower side thereof, that is, from below the base section 206. More specifically, clip 220 slides upwardly over the two downwardly extending plates (210 and 212) until tabs 222, which extend inwardly into the open center portion of clip 220 engage recessed portions 218. Connecting plate 214 does not extend to the lowermost edges of the forward and rearward plates 210 and 212. Accordingly, the recessed portions 218 flex inwardly as tapered edges 213 contact and run over tabs 222. Once the tapered edges 213 pass over the tabs, the lowermost portions of the plates 210 and 212, which are resilient, snap back to their original positions such that tabs 222 engage the recessed portions 218, at which point the upper edge 223 of clip 220 abuts the lower surface 211 of shoulder 208.

It will be appreciated that the open areas defined between the connecting plate 214 and the forward and rearward plates 210 and 212 define channels 224 that are laterally open along the entire length thereof. These channels allow a cord (not shown) to be inserted laterally into the channel. The cord may be looped over saddle 216 and inserted laterally into channel 224 on the opposite side of the hook. Clip 220, when engaged onto hook 200 as described, closes the lateral openings into channels 224 to define a passageway having open opposite ends through which the cord may pass.

In the embodiment shown in FIGS. 20 and 21, clip 220 is held firmly in engagement with hook 200 through the engagement of tabs 222 in recessed portions 218. The clip may not be removed downwardly because the tabs are engaged into the recesses. And the clip may not be removed upwardly because the upper edge of the clip abuts the lower surface of the peripheral shoulder of the base.

Clip 200 may be used with standard bungee-type cord, flat elastic cord, rope, wire rope, chain and other cords. The hook and clip are typically manufactured from plastic material. Those skilled in the art will appreciate, however, that the material used to fabricate the hook and clip depends upon the intended use of the hook, including consideration such as the kind of cord to be used, and strength requirements.

An alternate embodiment of a hook 200 that is designed to engage a clip (not shown) from the lower side (as with the hook of FIGS. 20 and 21) is shown in FIG. 22. The hook of FIG. 22 comprises laterally open channels 226 with a saddle 228 defining a transitional seat therebetween for receiving the cord (not shown). The channels 226 are formed into the base itself, which is relatively thicker than the I-beam construction of the hook of FIGS. 20 and 21. Downwardly extending forward and rearward prongs 230 engage the clip in the same manner as described above.

It will be appreciated that certain modifications to the hook may be made. For example, the laterally open channels through which the cord may be laterally inserted may be oriented differently in the base of the clip. As one example, the channels may be oriented such that they are paired in a fore/aft orientation relative to the longitudinal axis of the base (as opposed to the laterally side by side orientation shown in, for instance, FIG. 20). Further, there may be greater than two channels through the base, and greater than two cords may be used.

While the present invention has been described in terms of a preferred embodiment, it will be appreciated by one of ordinary skill that the spirit and scope of the invention is not limited to those embodiments, but extend to the various modifications and equivalents as defined in the appended claims.

I claim:

1. A hook, comprising:
   a body having a curved portion defining a hook, a shank adjacent the curved portion, and a base adjacent the shank, said base defining an upper peripheral shoulder and a lower base section extending downwardly therefrom;
   at least one channel formed through the base for receiving a cord, each channel including a lateral opening into the channel along the entire length thereof through which the cord is laterally insertable into the channel, and
   a clip engagable with said lower base section to close the at least one lateral opening when the clip is engaged to said base to thereby define a passageway through the base having open opposite ends.

2. The hook of claim 1 wherein said clip engages said base from the lower side thereof.

3. The hook of claim 1 including means for retaining said clip in engagement with said hook.

4. The hook of claim 3 wherein said means for retaining said clip comprises tabs on said clip and recesses on said lower base section cooperatively placed to engage said tabs.

5. The hook of claim 1 wherein said lower base section includes laterally extending forward and rearward downwardly extending plates and a connecting plate extending therebetween and interconnecting said forward and rearward plates, said at least one channel defined by an open space between said laterally extending forward and rearward downwardly extending plates and said connecting plate.

6. A hook, comprising:
   a body having a curved portion defining a hook, a shank adjacent the curved portion, and a base adjacent the shank, said base defining an upper peripheral shoulder and said base including downwardly extending forward and rearward lateral plates and a connecting plate extending therebetween and interconnecting said forward and rearward plates, said base further including at least one laterally open channel defined between said downwardly extending forward and rearward lateral plates and said connecting plate and an opening in said peripheral shoulder;

a clip engagable with said base to close the at least one laterally open channel to define a passageway through the base having open opposite ends.

7. The hook of claim 6 wherein said clip engages said base from below said peripheral shoulder.

8. The hook of claim 6 including means for retaining said clip in engagement with said hook.

9. The hook of claim 8 wherein said means for retaining said clip comprises tabs on said clip and recesses on said lower base section cooperatively placed to engage said tabs.

10. A hook, comprising:

a body having an upper curved portion defining a hook, a shank adjacent the curved portion, and a lower base adjacent the shank, said base defining a peripheral shoulder;

a channel formed through the base for receiving a cord, the channel including a lateral opening into the channel along the entire length thereof through which the cord is laterally insertable into the channel, and a clip attachable to the base from below said peripheral shoulder to close the lateral opening when the clip to thereby define a passageway through the base having open opposite ends.

11. The hook of claim 10 wherein an upper edge of said clip abuts a lower surface of said peripheral shoulder when said clip is attached to said base.

12. The hook of claim 11 including means for retaining said clip in engagement with said base.

13. The hook of claim 12 wherein said means for retaining said clip comprises tabs on said clip and recesses on said lower base section cooperatively placed to engage said tabs.

* * * * *